(12) United States Patent
Scherzer et al.

(10) Patent No.: US 9,148,843 B2
(45) Date of Patent: Sep. 29, 2015

(54) METHOD AND SYSTEM FOR SELECTING A WIRELESS NETWORK FOR OFFLOADING

(75) Inventors: Shimon Scherzer, Ramot Hashavim (IL); Tamir Scherzer, Herzelia (IL)

(73) Assignee: WeFi Inc., Tel Aviv (IL)

( * ) Notice: Subject to any disclaimer, the term of this patent is extended or adjusted under 35 U.S.C. 154(b) by 361 days.

(21) Appl. No.: 13/458,420

(22) Filed: Apr. 27, 2012

(65) Prior Publication Data

US 2013/0084835 A1 Apr. 4, 2013

Related U.S. Application Data

(63) Continuation-in-part of application No. 13/400,056, filed on Feb. 18, 2012, now Pat. No. 8,644,828, and a continuation-in-part of application No. 11/441,827, filed on May 25, 2006, now Pat. No. 8,751,648.

(60) Provisional application No. 61/479,570, filed on Apr. 27, 2011.

(51) Int. Cl.
| | | |
|---|---|---|
| *G06F 15/16* | (2006.01) |
| *H04W 48/14* | (2009.01) |
| *H04W 48/18* | (2009.01) |
| *H04W 28/08* | (2009.01) |
| *H04L 12/28* | (2006.01) |
| *H04W 48/16* | (2009.01) |
| *H04W 48/20* | (2009.01) |
| *H04W 64/00* | (2009.01) |
| *H04W 72/04* | (2009.01) |
| *H04W 74/00* | (2009.01) |
| *H04W 88/02* | (2009.01) |
| *H04W 36/22* | (2009.01) |
| *H04W 88/06* | (2009.01) |
| *H04W 24/08* | (2009.01) |

(52) U.S. Cl.
CPC .............. *H04W 48/14* (2013.01); *H04W 28/08* (2013.01); *H04W 48/18* (2013.01); *H04L 12/2801* (2013.01); *H04W 24/08* (2013.01); *H04W 36/22* (2013.01); *H04W 48/16* (2013.01); *H04W 48/20* (2013.01); *H04W 64/00* (2013.01); *H04W 72/0406* (2013.01); *H04W 74/004* (2013.01); *H04W 88/02* (2013.01); *H04W 88/06* (2013.01)

(58) Field of Classification Search
CPC ...................................................... H04L 29/00
See application file for complete search history.

(56) References Cited

U.S. PATENT DOCUMENTS

| | | | | |
|---|---|---|---|---|
| 5,581,597 | A * | 12/1996 | Dent et al. .................... | 455/450 |
| 2004/0048629 | A1* | 3/2004 | Yoon .............................. | 455/466 |
| 2004/0054774 | A1* | 3/2004 | Barber et al. ................. | 709/224 |
| 2004/0109410 | A1* | 6/2004 | Chase et al. .................. | 370/229 |
| 2005/0071476 | A1* | 3/2005 | Tejaswini et al. ............. | 709/227 |

(Continued)

*Primary Examiner* — Brian P Whipple
*Assistant Examiner* — Keyvan Emdadi
(74) *Attorney, Agent, or Firm* — Finnegan, Henderson, Farabow, Garrett & Dunner, LLP

(57) ABSTRACT

The present invention is directed to a method and system for selecting a wireless network for offloading network traffic from another network. In one embodiment, a method and system for offloading network traffic in a wireless user terminal from a first network, such as cellular network, onto a second network, such as a WiFi network, includes determining a measure of the relationship between the user of the wireless user terminal and the owner of the access point for the second network. The measure of the relationship can be used to provide an indication of the likelihood that the owner of the access point will grant access to the user of the wireless user terminal.

13 Claims, 6 Drawing Sheets

(56) References Cited

U.S. PATENT DOCUMENTS

| | | | |
|---|---|---|---|
| 2005/0076084 A1* | 4/2005 | Loughmiller et al. | 709/206 |
| 2005/0114542 A1* | 5/2005 | Hodges et al. | 709/237 |
| 2005/0255886 A1* | 11/2005 | Aaltonen et al. | 455/558 |
| 2005/0257055 A1* | 11/2005 | Anderson | 713/170 |
| 2006/0075051 A1* | 4/2006 | Jain et al. | 709/206 |
| 2007/0066304 A1* | 3/2007 | Lee | 455/436 |
| 2007/0143499 A1* | 6/2007 | Chang | 709/245 |
| 2010/0174813 A1* | 7/2010 | Hildreth et al. | 709/224 |

* cited by examiner

METHOD AND SYSTEM FOR SELECTING A WIRELESS NETWORK FOR OFFLOADING

CROSS-REFERENCE TO RELATED APPLICATIONS

This application claims any and all benefits as provided by law, including benefit under 35 U.S.C. §119(e), of U.S. Provisional Application No. 61/475,570 filed Apr. 27, 2011, which is hereby incorporated by reference in its entirety.

This application is a continuation-in-part of U.S. patent application Ser. No. 13/400,056 filed Feb. 18, 2012, and claims any and all benefits as provided by law of the prior filed applications and the contents of the earlier filed application is hereby incorporated by reference in its entirety.

This application is a continuation-in-part of U.S. patent application Ser. No. 11/441,827 filed May 25, 2006, and claims any and all benefits as provided by law of the prior filed applications and the contents of the earlier filed application is hereby incorporated by reference in its entirety.

This application is related to U.S. application Ser. No. 13/362,554, filed on Jan. 31, 2012, which is hereby incorporated by reference in its entirety.

STATEMENT REGARDING FEDERALLY SPONSORED RESEARCH

Not Applicable

REFERENCE TO MICROFICHE APPENDIX

Not Applicable

BACKGROUND

1. Technical Field of the Invention

The present invention is directed to a method and system for selecting a wireless network access point for offloading network traffic from another network. More specifically, the method and system for offloading network traffic includes determining a measure of the relationship between the user of the wireless user terminal and the owner/operator of the access point for the second network that can be used to provide an indication of the likelihood that the owner/operator of the access point will grant access to the user of the wireless user terminal.

2. Description of the Prior Art

In so called "walled garden" environments, such as cellular networks (voice and data), the network is fully owned and operated by cellular operator and the cellular operator controls all aspects of access to the network. Conversely, the ownership and management of local wireless networks, such as WiFi networks, are owned and operated by many separate entities (individuals and companies) and thus form a fragmented and heterogeneous collection of wireless networks. While cellular data network resources tend to be limited (both in terms of bandwidth and access locations) and in many locations utilized to capacity, local wireless resources tend to be readily available and underutilized. In many situations, it may be desirable to enable a wireless user terminal, such as a smart phone or cellular connected device to offload some or all of its voice and/or data communication functions to a local wireless network, such as a WiFi network. This enables cellular network carriers to expand their user capacity without the added expensive of cellular resource equipment (e.g., cellular network towers and transceivers, microcells, etc.).

However, because the local wireless networks are fragmented and heterogeneous, there are many different technologies (e.g., IEEE 802.11 a/b/g/n, WiMAX), access methods (e.g., WPA, WPA2 WEP, Captive Portal) and many different and diverse owners/operators, obtaining access to these diverse networks can be a complicated and tedious process.

SUMMARY

Consequently, it is desirable to provide a specialized mechanism to perform the functions and operations associated with facilitating the selection of the local wireless network access point for offloading. The process can include identifying local wireless networks that offer potential opportunities for offloading, obtaining the necessary information (e.g., keys, passwords and/or access credentials) to establish a connection to these local wireless networks for offloading, and properly managing this information.

In accordance with some embodiments of the invention, the method and system for facilitating the management of offloading opportunities can include one or more components or modules for the discovery of available local wireless network access points ("APs"), one or more components or modules for facilitating the transfer of network access information (e.g., keys, passwords and/or access credentials) that minimize the user's involvement (e.g., centralized management and sharing of keys, passwords and access credentials); and one or more components or modules for encouraging the subscriber or cellular network user to establish a network connection to one of the local wireless networks to enable offloading from the cellular network to the local wireless network.

In accordance with some embodiments of the invention, the method and system the method and system for facilitating the management of offloading opportunities can include as part of the discovery of local wireless network access points, one or more components or modules for determining one or more relationship coefficients. The relationship coefficients can be determined as a function of information relating to or indicating the nature of relationships between the user of the wireless user terminal and owner or operator of the local wireless AP. At least one of the relationship coefficients can indicate the likelihood that an owner or operator will provide the owner of a wireless user terminal access (e.g., by providing access information) to their local wireless network. In addition, in accordance with some embodiments of the invention, the method and system can include comparing at least one of the relationship coefficients to a predefined threshold and where the relationship coefficient, for example, is equal to or exceeds the predefined threshold, the wireless user terminal can initiate a procedure for obtaining access to one or more wireless network APs.

In accordance with implementations of the invention, one or more of the following capabilities may be provided. The system and method according to the invention provide a mechanism for ranking and/or filtering wireless network access points that are discovered by a wireless user terminal in order to facility the selection of APs that meet the desired criteria.

These and other capabilities of the invention, along with the invention itself, will be more fully understood after a review of the following figures, detailed description, and claims.

DETAILED DESCRIPTION OF PREFERRED EMBODIMENTS

Figure 1:
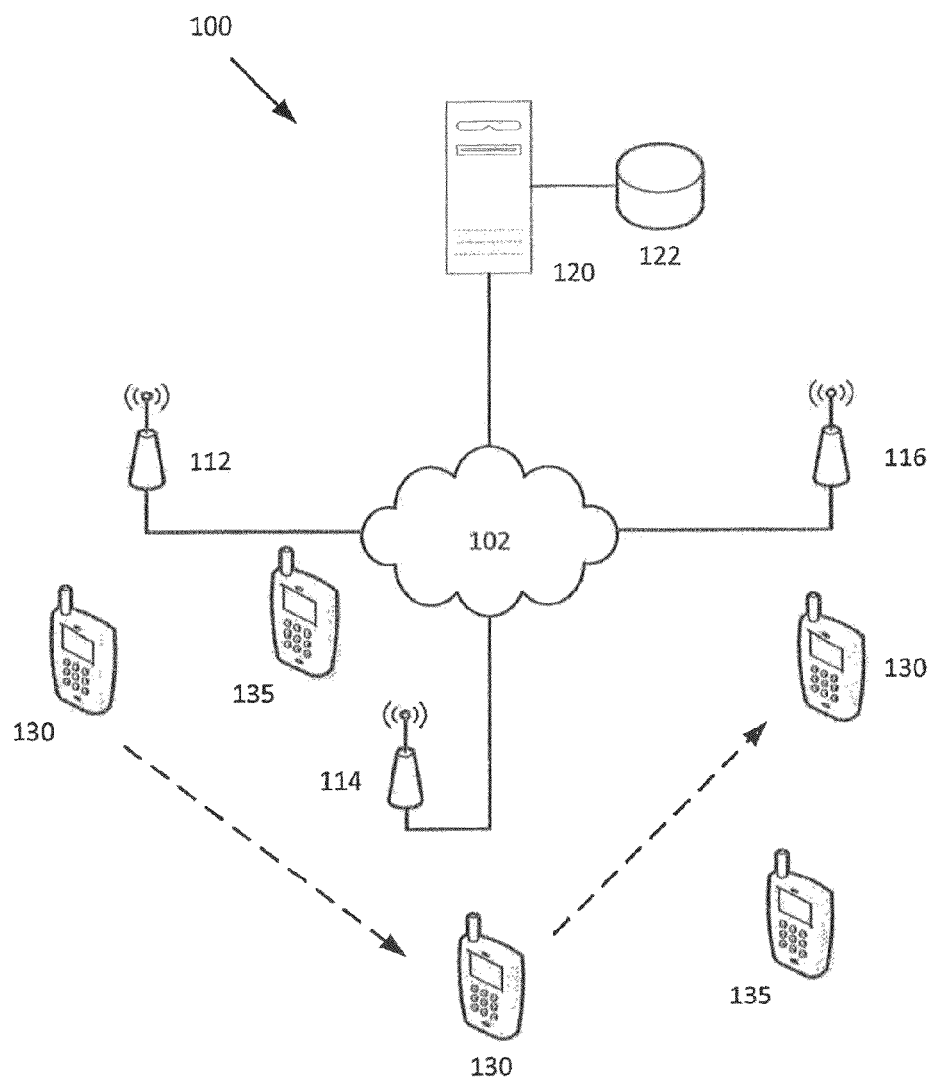
FIG. 1 is a block diagram of a system for offloading cellular network onto a local wireless network according to an embodiment of the invention.

The present invention is directed to methods and system for facilitating the discovery of access points, the establishment of connections with the access points and the management of connections to local wireless network through the access points that can enable wireless user terminals to offload cellular wireless network traffic (voice and data) onto local wireless networks. The local wireless networks can include, but are not limited to, WiFi networks (e.g., IEEE 802.11 a/b/g/n networks, WiMAX). The invention can be used by any wireless user terminal that has the capability to connect to two wireless networks. By way of example, the wireless user terminal can be a smart phone capable of connecting to the subscriber's cellular network and an alternative wireless network, such as a WiFi network. Alternatively, the wireless user terminal can be any device capable of connecting to two separate networks. In accordance with some embodiments of the invention, the method and system can include a component or module that enables the management of the information used to establish connections to an alternative wireless network.

In accordance with some embodiments of the invention, the method and system for facilitating the management of offloading opportunities can include one or more components or modules for the discovery of local wireless network access points ("APs"), one or more components or modules for facilitating the transfer of network access information (e.g., keys, passwords and/or access credentials) that minimize the user's involvement (e.g., centralized management and sharing of keys, passwords and access credentials); and one or more components or modules for encouraging the subscriber or cellular network user to establish a network connection to one of the local wireless networks to enable offloading from the cellular network to the local wireless network.

In accordance with some embodiments of the invention, the method and system the method and system for facilitating the management of offloading opportunities can include as part of the discovery of local wireless network offloading access points one or more components or modules for determining one or more relationship coefficients. The relationship coefficients can be determined as a function of information relating to or indicating the nature of relationships between the user of the wireless user terminal and owner or operator of the local wireless AP. At least one of the relationship coefficients can indicate the likelihood that an owner or operator will provide the owner of a wireless user terminal access to their local wireless network. In addition, in accordance with some embodiments of the invention, the method and system can include comparing at least one of the relationship coefficients to a predefined threshold and where the relationship coefficient, for example meets or exceeds the predefined threshold, the wireless user terminal can initiate a procedure for obtaining access to one or more wireless network APs. In some embodiments, the relationship coefficient and the threshold can be selected whereby the relationship coefficient is compared with the predefined threshold and procedure for obtaining access to the wireless network access point is initiated when the relationship coefficient is below the predefined threshold.

FIG. 1 shows a system 100 according to one or more embodiments of the present invention. The system 100 can include a plurality of wireless user terminals 130 and 135 that can communicate using a carrier cellular network (no shown) and can communicate using a wireless local area network. The wireless local area network includes a plurality of wireless network access points 112, 114 and 116 connected to a network 102, such as the internet. The system 100 can also include a central server 120 and the central server 120 can include a database 122 for network information, access point owner/operator identification information and network access information. In accordance with some embodiments of the invention, the wireless user terminals can be in various locations during a period time, such as a day. For example, wireless use terminal 130 can be in the proximity of wireless access point 112 at one point in time or during specific time period, before moving proximate wireless access point 114 and then wireless access point 116.

In accordance with some embodiments of the invention, each wireless terminal can collect data about each AP within range of the wireless user terminal over a period of time, at a given time of day and/or during a day of the week. For example, in one embodiment, the terminal can determine the number of times that an AP is within range at various times or time periods during the day, for example, in the morning, at noon time, in the afternoon and in the evening. This information can be collected on a daily basis or broken down further according to working days, and weekend days and holidays. This information can be used to determine relationships between the user of the wireless terminal and a given AP. In accordance with some embodiments of the invention, by filtering (or ranking) by proximity, frequency and time of day, assumptions about the nature of the AP can be made. For example, the AP having the highest signal strength and highest frequency in the night time or evening can be presumed to be a home AP. This can be further confirmed where the signal strength and frequency are also high during weekend days and holidays. In another example, the AP having the highest signal strength during the morning and afternoon time periods can be presumed to a work AP. In a further example, the AP having the highest signal strength during noon time can be presumed to be a favorite lunch place. Table 1 below shows an example of how the data can be collected and organized for a given wireless terminal.

TABLE 1

|  | AP1 | AP2 | AP3 | AP4 | AP5 | APn |
| --- | --- | --- | --- | --- | --- | --- |
| Morning | 12 | 35 | 10 | 23 | 57 | 251 |
| Noon | 89 | 3 | 45 | 15 | 3 | 121 |
| Afternoon | 1 | 11 | 32 | 6 | 9 | 213 |
| Evening/Night | 10 | 356 | 1 | 2 | 0 | 7 |

Table 1 represents a set of APs "seen" (discovered and determined to be within range of the wireless terminal) and reported by a given wireless terminal over a period of time. In one embodiment the wireless terminal can be referenced according to its telephone number. Table 1 shows that AP1 has been detected frequently at noon time while AP2 has been detected many times during evening/night periods and APn has been detected with high frequency during work hours. In accordance with some embodiments of the invention, AP2 can be associated with the home or residence of the user of the wireless terminal while Apt can be associated with a popular lunch place. In addition, APn can be associated with the user's place of employment.

Each of the detected APs provides a potential opportunity for offloading network traffic from the cellular network used by the wireless user terminals. This may be particularly desirable when a wireless user terminal is in a location that receives poor cellular network service, such as an office building, a shopping mall or a remote location. In accordance with some embodiments of the invention, one of the initial steps includes the discovery of APs that provide a potential opportunity for offloading. Where the AP is open (e.g., does not require a key, password or access credentials) the wireless user terminal can be automatically configured to connect to the access point and a further system, component or module can determine whether or not to use the wireless network connection through that AP to offload cellular services. Examples of these system are disclosed in commonly owned U.S. patent application Ser. Nos. 13/400,056 and 13/362,554, both of which is hereby incorporated by reference in their entirety.

In accordance with some embodiments of the invention, where the wireless user terminal includes location determination capability, such as a global positioning system (GPS) or other location based services functionality, the location of the AP can be collected. The location of the AP can be used to determine a street address and a telephone number to associate with the AP.

In accordance with some embodiments of the invention, the discovery function is directed to using wireless user terminals to discover wireless APs and determine any potential relationships between the owners or operators of the wireless APs and the users of the wireless terminals. In accordance with some embodiments of the invention, the wireless user terminals can be any device that includes two or more wireless connections, including, but not limited to, cellular telephones, smart-phones, tablet computers, laptops and other portable computing devices and equipment. In accordance with some embodiments, the wireless user terminal can also include a vehicle that provides transportation, for example a train that uses cellular data services to provide data services to passengers, but uses WiFi networks in underground tunnels and stations where cellular data service is poor. In accordance with some embodiments of the invention, AP can be any device that can provide an alternative wireless network connection for the wireless user terminal, including, but not limited to, WiFi access points and routers, femto-cells, micro-cells and similar devices.

In accordance with some embodiments of the invention, a system and method are provided for determining the likelihood that a particular terminal $T_i$ is able to obtain Internet access through access point $A_j$, if in sufficient proximity. In accordance with the invention, one or more relationship coefficients, $C_{ij}$ (e.g., having a value=0 to 1) are determined based on additional data, such as the frequency data shown in Table 1. In accordance with one embodiment of the invention, the value 0 can signify no likelihood for access while a value of 1 can signify certainty of access. In accordance with some embodiments of the invention, the value of relationship coefficient, C can be determined as a function of an AP owner's apparent intention (e.g., a public AP provides open access to all visitors, a private business' APs provides access that can be restricted to customers and other select users) and/or the nature and/or extent of social, business or other relationships between the user and the owner of the AP. For example, close friends will normally allow access to each other's APs, while strangers will not likely share access with each other. Business associates might provide access, but probability of providing access may depend on the nature of the business or other relationship between the individuals or the businesses.

In accordance with some embodiments of the invention, for example, a WiFi router and its owner would have relationship coefficient "C" that is very close to 1, meaning that the owner is highly likely to provide access to herself/himself. And accordingly, a wireless user terminal and WiFi access points that belong to two strangers will likely have a relationship coefficient that is close to 0. In further examples, a second order family member visiting may have a higher relationship coefficient, for example, C=0.8, a patient visiting doctor's office may have relationship coefficient, C=0.5. In addition, the relationship coefficient can change over time, for example, where the relationship between the owner of the AP and the owner of the wireless user terminal change over time. For example, a user makes a new friend and the friend owns an AP. Over time, the frequency that the AP is in range of the user's wireless terminal increases and, as a result, the relationship coefficient can increase as well. In accordance with some embodiments of the invention, when the frequency of detection of an AP decreases, the system can be configured to keep the same or reduce the relationship coefficient between the AP and wireless user terminal. In accordance with some embodiments, the relationship coefficient can be decreased using an aging mechanism that reduces the relationship coefficient if the relationship coefficient or any of the factors do not increase over a predefined period of time.

In accordance with the invention, public APs can be considered a special case, where the relationship coefficient, C, is relatively high because the owner of the AP provides open access intentionally.

In accordance with some embodiments of the invention, a predetermined access threshold can be set and periodically the relationship coefficient, C can be compared to the threshold. The result of the comparison can be used to trigger or initiate a process through which the wireless user terminal can receive the information it needs to connect to the AP and obtain network access, for example, an internet connection. In accordance with some embodiments, where a larger relationship coefficient indicates a higher likelihood of access, when the relationship coefficient reaches or exceeds the threshold (e.g., C>=0.75), a procedure to obtain access can be triggered. The value of the threshold can vary from environment to environment. In accordance with some embodiments of the invention, the threshold value can be determined by collecting historical data.

In accordance with some embodiments of the invention, the relationship coefficient can be determined primarily as a function of social relationships, including, but not limited to, family, friends, customer, student, for example. In accordance with these embodiments, it is useful to associate APs with their owners or operators and wireless user terminals with their uses. In accordance with some embodiments, the one or more relationship coefficients can be determined as a function of AP openness. For example, a public hotspot AP can include a factor that increases (e.g., either additively or by multiplication) the relationship coefficient with each user and a private AP can either not use such a factor (e.g., the factor is set to 0 or 1) or the factor can be selected such that it decreases (e.g., either subtractively or by multiplication) the relationship coefficient.

In accordance with some embodiments of the invention, one or more of the relationship coefficients, C, can be determined using behavioral and contextual analysis. For example, behavioral information can be extracted from data that is obtained by users' terminals and stored at a centralized database. This data can include, but is not limited to, for example, wireless access point scan results (e.g., determining for each AP, a set of SSID, MAC address, and RSSI values for each, the location and time that the scan was made, the external IP address (e.g., when connected) to identify the network connection provider (e.g., ISP) and obtain information about the provider, and contextual data the can be obtained from information stored on the wireless user terminals (e.g., the user's contact list, the user's call/text/email histories, the user's telephone number or other phone identifier, such as EIN, the user's email address and other information stored on the phone that can be used to identify the user and people who have a relationship with the user of the wireless terminal.

In accordance with one embodiment of the invention, a high degree of reliability of the relationship coefficient can be obtained by determining the relationship coefficient as a function of many factors (e.g., behavioral, social and contextual factor). For example, a high relationship coefficient value can be determined where the user have been determined to be close proximity to a particular access point many times (e.g. over a short period of time) or for long periods of time (e.g., including both frequency and duration of time). In addition, the time of a day and/or the days in a week when the wireless user terminal was in close proximity to a given access points can be an indicator of the type of relationships. This information can be compared with what is known about societal behavior. For example, where the wireless user terminal is frequently in proximity to a specific AP during the night, the location is likely to be the user's residence or that of a family member. In a further example, if the wireless user terminal is frequently in proximity to an AP during working hours, the user is likely to be at their place of work or a regular guest that suggests a request for access will successful.

In accordance with some embodiments of the invention, one or more contextual indicators can be used to determine one or more relationship coefficients. In one example, the information stored on the wireless user terminal including, but not limited to, the user's contacts list and use history (e.g., the call logs, text message history/inbox) indicating other people contacted and how frequently can be used to determine one or more relationship coefficients. For example, if the AP owner (individual or business entity) can be found in the contacts list or use history (e.g., either by telephone number or name) than the system or method can consider there is an increased likelihood of a personal relationship and the relationship coefficient can be increased, (e.g., either additively or by multiplication). In accordance with some embodiments of the invention, increased reliability of the relationship coefficient to predict a relationship that is likely to grant access can be determined as a function the two factors, the frequent proximity and presence in contact list. In accordance with some embodiments, separate relationship coefficients, one based on frequent proximity and one based on presence in a contact list or history log can be determined and the coefficients can either be used separately or can be combined to form a single coefficient.

In accordance with some embodiments of the invention, one or more relationship coefficients can be determined as part of a process for obtaining access to an AP. Access can be obtained by the receipt of access information including, but not limited to, a network access password or key (e.g., a WEP key, a WPA key or password) or other credentials (e.g., captive portal credentials) that enables the wireless user terminal to connect to the AP and establish a network connection.

The process can include the following elements: a) collect AP scan results from terminals to build time and proximity table for each terminal; b) determine AP owner/operator information to enable the wireless user terminal to generate an access request when the relationship coefficient value reaches the preset threshold; this information can include, for example, AP name or identifier, MAC address and associated owner/operator identifier (e.g., telephone number, name, email address); c) determine if the owner/operator identifier (e.g., telephone # or email address) is found in the wireless user terminal contact list or use history; Optionally, the frequency of calls, text, or emails to the owner/operator identifier(s) by searching the use history can also be determined and compared to a threshold; d) If the owner/operator identifier(s) are found in the contact list and/or the contact history is sufficiently frequent (e.g., above a threshold), the wireless user terminal can generate an access request to the user terminal of the owner/operator of the AP; and e) upon receipt of the request at the terminal of the owner/operator, a determination can be made whether grant access. Access can be granted by transferring the access request information.

In accordance with some embodiments of the invention, a relationship coefficient can be determined for the user of the wireless terminal making the request. The relationship coefficient can be determined by the terminal of the AP owner/operator as a function of one or more of the contextual indicators (e.g., presence in the contact list, call/SMS/email history etc.). If the contextual coefficient is above a predefined threshold, the terminal of the owner/operator can send the access information to the wireless user terminal and the wireless user terminal can use the access information to connect to the AP and obtain network access.

In accordance with some embodiments of the invention, an indication or dialog box can be presented to the user on the wireless user terminal to enable the user to confirm that the request can be sent to the user terminal of the AP owner/operator when it is triggered. The indication or dialog box can simply state that a request for access is being sent to the AP owner/operator and the user can either approve or disapprove (e.g., via OK and Cancel buttons) to allow the process to continue. In accordance with some embodiments of the invention, an indication or dialog box can be presented on the user terminal of the AP owner/operator to notify the owner/operator of the request for access and/or enable the AP owner/operator to confirm that access should be granted and access information should be sent. The indication or dialog box can simply state that a request for access has been received from the user and the AP owner/operator can either approve or disapprove (e.g., via OK and Cancel buttons) to allow the process to continue.

In accordance with some embodiments of the invention, at each step or element of process a new relationship coefficient can be calculated. For example, if the trigger is to be based on a strong contextual indication, the relationship coefficient can be set to a relatively larger initial value when the AP owner/operator is determine to be in user's contact list and/or the coefficient can be incremented if the call/text/email history is or becomes very active. In some embodiments of the invention, the magnitude of the increase or increment can be larger (e.g., either additively or by multiplication) as a function of the increase communication activity. For example, where the user and the AP owner/operator correspond once per week, the increase in the relationship coefficient can increase by a small value (e.g., 1% or 0.01), whereas if the user and the AP owner/operator correspond once per day, the increase in the relationship coefficient can increase by a larger value (e.g., 10% or 0.10).

In accordance with some embodiments, frequency of proximity can be used as an initial filter and password exchange trigger in the relationship determination process. In this embodiment, the frequency and time of day values that a wireless user terminal has been in proximity to an AP can be used to determine potential relationships. Where the frequency and/or time of day values are relatively low (e.g., less than a threshold, such as 5), no potential for offloading to that AP is indicated.

In accordance with some embodiments of the invention, identification of the AP owner/operator is useful for the determination of relationship coefficients that are determined as a function of contextual factors, such as whether the AP owner/operator is in the contacts list. In accordance with some embodiments of the invention, the system can associate the terminal of the AP owner/operator with the AP through behavioral data such as "hours access point was seen by the terminal" or contextual data, the act of setting up the connection to the AP to obtain Internet access by manually inputting the password or other access credential. After a wireless user terminal is identified as an AP owner/operator's terminal, the International Mobile Subscriber Identity (IMSI) can be obtained (by software client in the terminal) and this information can be used to obtain the AP owner/operator's telephone number that can subsequently be associated with the AP. The telephone number allows anybody that has this telephone number in his contact list to identify the AP owner/operator.

Figure 2:
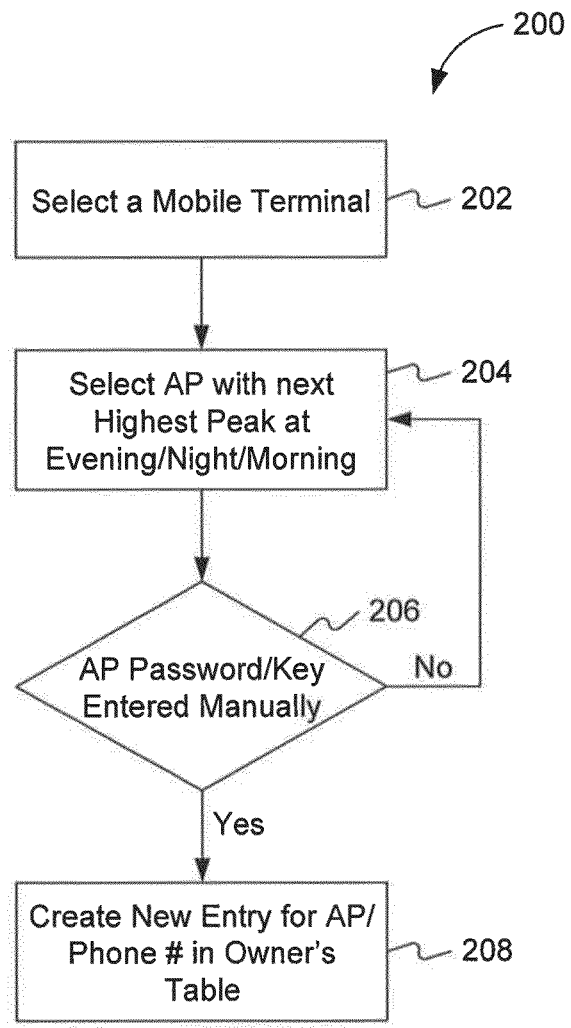
FIG. 2 is a flowchart of a method for determining a terminal associated with an access point owner according to an embodiment of the invention.

FIG. 2 shows a flow chart of a method 200 for identifying the owner/operator of an AP and associating owner/operator identifying information (e.g., a telephone number or email address) with an AP. In accordance with some embodiments of the invention, where the wireless user terminal frequently discovers a wireless network AP during the times that the use is normally expected to be home and the network access information was entered manually, one can presume that the wireless network AP is owned or controlled by the user. At 202, a mobile user terminal is selected and at 204, the data gathered by the wireless user terminal relating wireless network APs that are within reach of the wireless user terminal can be sorted or filtered to identify the AP detected most frequently during evening or early morning. This can be accomplished using software, such as a software client, executed on the wireless user terminal to sort or filter AP data. At 206, the system can check to determine whether network access information (e.g., key, password or network access information) was entered manually. At 208, if the network access information was entered manually, the telephone number of the user's wireless terminal and/or any other user identifying information can be used as an AP owner/operator identifying information. This AP owner/operator identifying information and the association of this information can be stored in local memory on the wireless user terminal and can be sent of storage to a central server, such as server 120 and stored in a database, such as database 122.

In accordance with some embodiments of the invention, there is little need to associate a public AP with its owner's phone number but it can be useful to identify the AP as function of behavioral and/or contextual information. For example, using the time and proximity information, the AP can be identified by when the most opportunities for connection occur, such as morning, noon or afternoon. Alternatively, the AP can be identified based on information provided by the AP itself, such as the SSID or external IP address assigned. The SSID normally includes an indication of the name of the business or entity that operates the AP or provides a hint to business name. Further, the IP address can also be used to lookup the name of the owner/operator. In accordance with some embodiments of the invention, the identity of the AP can be determined by AP location information available from the wireless user terminal (e.g., GPS or IP address based location services).

In accordance with some embodiments of the invention, the relationship coefficient can be determined as a function of one or more of the following relationship factors—time of day that AP is in range and accessible; the average RSSI determined; is the identifier of the AP owner/operator in the user's contact list; the number of calls in/out with the AP owner/operator in call history list (e.g., in total or over a period of time); the number of SMSs and/or emails to/from the AP owner in the wireless terminal history (e.g., stored on the terminal or over a period of time); is the user in the AP owner/operator's contact list; the number of calls in/out with the user in the AP owner/operator call history list (e.g., in total or over a period of time); the number of SMSs and/or emails to/from the user in the AP owner/operator's terminal history (e.g., stored on the terminal or over a period of time); type of AP (e.g., public or private). In accordance with some embodiments of the invention, the relationship coefficient can be determined by equation (1) below:

$$Relationship Coefficient = \sum_{1}^{k} a_k x_k \quad (1)$$

where $x_k$ is one or more of the relationship factors identified above and $a_k$ is a normalizing factor that can be added to or multiplied with the relationship factors. In accordance with one embodiment, k=
1. Time Periods AP detected
2. Average RSSI detected
3. AP owner/operator found in user contact list
4. Number of calls in/out with AP owner/operator in user call history
5. Number of SMSs with AP owner/operator in user SMS history over a predefined time period
6. User found in AP owner/operator contact list
7. Number of calls in/out to user in AP owner/operator call history
8. Number of SMSs with user in AP owner/operator SMS history over a predefined time period
9. Type of access point (e.g., private or public), if public, x gets maximum value.

In accordance with some embodiments of the present invention, the relationship coefficient increases as the process progresses. If the value of the relationship coefficient exceeds a predetermined threshold, a request for access information can be initiated.

In accordance with some embodiments of the invention, the process for determining one or more relationship coefficients and subsequently the likelihood to obtain Internet access through the AP can be used to establish a connection with the AP for the purpose of offloading network traffic onto the wireless network provided by the AP.

Once an AP is associated with an owner/operator identifier, such as a phone number or determined to be public (including associated business name) the system can identify APs that are potential candidates for offloading. In accordance with some embodiments, a software client on the wireless user terminal can search the user contact list, the phone call history, email history (e.g., inbox, outbox), SMS history and other information stored on the wireless user terminal. Using the frequency and proximity information, candidate APs can be further selected for connection opportunity based on time of day availability and frequency (e.g., higher indicates a better opportunity candidate). For example, from Table 1, the wireless user terminal can select AP1 during noon time and get the owner/operator identifier (e.g., the phone number) of AP1. Next, the software client can search for the owner/operator identifier (e.g., phone number) in the user's contact list to identify the name of the owner/operator. If the search is successful, a factor can be added to the relationship component and more analysis can be done: a) the software client can count how many times the AP owner/operator called or was called in a predetermined time period and if the count is greater than a predetermined threshold the relationship component can be increased by the amount of one of the factors; b) the software client can count how many email messages were sent to or received from the AP owner/operator and if the count is greater than a predetermined threshold the relationship component can be increased by the amount of one of the factors; c) the software client can count how many SMS messages were sent to or received from the AP owner/operator and if the count is greater than a predetermined threshold the relationship component can be increased by the amount of one of the factors.

In accordance with the invention, a software client on can use at least one of information about the frequency of visits to location where the access point is and contextual closeness signified by information found in the contacts lists and contacts history to infer a relationship between the user and the AP owner/operator and subsequently determine the associated relationship coefficient. In accordance with some embodiments of the invention, once the coefficient is determined to be greater than preset threshold, a request of access information can be initiated whereby the wireless user terminal sends request for access information. In accordance with some embodiments of the invention, the request for access information can be sent to the terminal of the AP owner/operator and the software client on the terminal of the AP owner/operator, either automatically or through AP owner/operator interaction, grant or reject the user's request for access information. If the request of access information is granted, the terminal of the AP owner/operator can send the access information to the wireless user terminal and access information (e.g., SSID, MAC information, password, key and/or other credentials) can be stored in memory at the wireless user terminal such that when wireless user terminal is able to connect to the AP, the wireless user terminal can establish a wireless connection with the AP to access the Internet.

In accordance with some embodiments, the request for access information can be sent to a central server that stores AP identification information and/or AP owner/operator identification information and access information for the associated AP. In this embodiment, the central server, either automatically or through AP owner/operator interaction (e.g., a confirmation request can be transmitted to the terminal of the AP owner/operator and the software client automatically or through AP owner/operator interaction confirm or deny the request), grant or reject the user's request for access information. If the request of access information is granted, the central server can send the access information to the wireless user terminal and the access information (e.g., SSID, MAC information, password, key and/or other credentials) can be stored in memory at the wireless user terminal such that when wireless user terminal is able to connect to the AP, the wireless user terminal can establish a wireless connection with the AP to access the Internet.

In accordance with some embodiments of the invention, the method for obtaining access to the AP can be performed in off-line mode (as described above) wherein the wireless user terminal is not able to connect to the AP, but periodically evaluates one or more of the relationship coefficients for a given AP to compare it with the predefined threshold. Where the relationship coefficient meets or exceeds the threshold, the software client on the wireless user terminal can initiate a process whereby a request for access information is transmitted either to the terminal of the AP owner/operator or to one or more central servers that are configured and authorized to distribute access information for a given AP.

In accordance with some embodiments of the invention, the method for obtaining access to the AP can be performed in real time. In this embodiment, the wireless user terminal can be at a location where it can discover and connect to the AP. In accordance with this embodiment of the invention, a software client on the wireless user terminal can be configured to detect a specific AP and send a query to one or more central servers to search its database for the AP owner/operator identification information (e.g., the AP owner/operator identification information can be associated with an SSID and MAC address in the database). If the AP owner/operator identification information is found in the database of the central server, the AP owner/operator identification information can be transmitted to the software client at the wireless user terminal. The software client at the wireless user terminal can search for the AP owner/operator identification information (e.g., the phone number) in the user's contact list or the history logs. If any of the AP owner/operator identification information is found the contact list or the history logs, the software client can count the number of communications (e.g., calls, SMS message, email messages) and determine one or more relationship coefficients. If one or more of the relationship coefficients meet or exceed the predefined threshold, the software client can initiate the process to request access information for the AP.

In accordance with some embodiments of the invention, a software client can be provided on one or more wireless user terminals that can be programmed and configured to implement one or more of the functions described herein. The terminal of the AP owner/operator can be either a wireless terminal or a wired terminal connected to a network such as the Internet. The terminal of the AP owner/operator can include a software client or software program configured to implement one or more of the functions describe herein. The central server can include server software or a software application that enables wireless user terminals and terminals of the AP owner/operator to communicate with it. The communications between the wireless user terminal, the terminal of the AP owner/operator and the central server can be accomplished using any know messaging method, including email, SMS or text messages, proprietary messaging.

The software client can include one or modules or components that are programmed and configured to perform one or more of the functions described herein.

Figure 3:
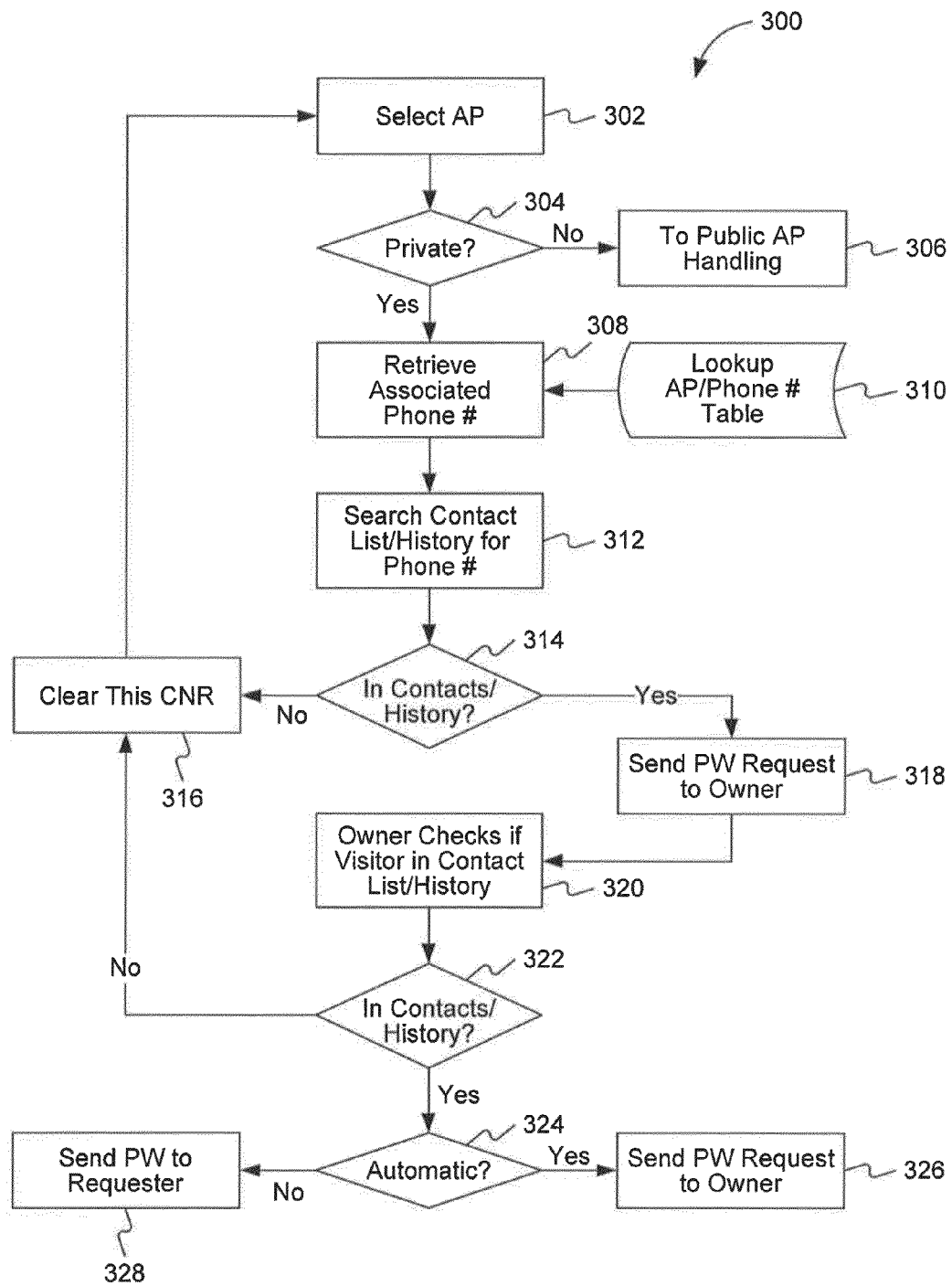
FIG. 3 is a flowchart of a method for requesting access information according to an embodiment of the invention.

FIG. 3 shows a flow chart of a method 300 for offline pairing and sharing of network access information for private access points according to some embodiments of the invention. At 302, the wireless user terminal, for example using software executed thereon, selects a wireless network AP which was previously detected and at 304 determines whether the AP is a public or private type of AP. A public AP is an AP that is probably open to the public and does not require a key, password or credentials to gain access. A private AP is an AP that is not open to the public and likely will require a key, password or credentials to gain access. The wireless user terminal can check information stored in memory regarding the AP to determine whether a key, password or credentials were needed to access the network through the AP. Where the AP is a public AP, the process branches to separate process for handling public APs. Where the AP is a private AP, the process continues at 308 where AP owner/operator identifying information is obtained by either looking up the AP owner/operator identifying information in either a local table in the wireless user terminal or looking up the AP owner/operator identifying information in information stored on a central server, such as central server 120. The wireless user terminal can send the SSID and MAC address of the AP to the central server and the central server can search its files or a database to determine if the AP owner/operator identifying information is found in the database. If the SSID and MAC address are found by the central server, the AP owner/operator identifying information (e.g., a telephone number or an email address0 associated with the AP can be returned to the wireless user terminal. At 312, the wireless user terminal can search information stored on the wireless user terminal that indicates whether the user of the wireless user terminal has communicated with the AP owner/operator. For example, the telephone contact list can be searched to determine whether the AP owner/operator is in the user's contact list. Alternatively, the call history, the SMS message inbox/history and the email history can be searched. At 314, if the AP owner/operator's contact information is found in the contact list, call history, SMS history or any other communication history or log in the wireless user device, there is a likelihood that the user and the AP owner/operator have a relationship that can trigger, at 318, the transmission of a request, either to the user terminal of the AP owner/operator or to the central server requesting access information for the AP.

At 320, the user terminal of the AP owner/operator can receive the request and confirm that the requestor and the owner/operator already have relationship. At 322, the AP owner/operator user terminal can search its contacts, call history, SMS history and email to determine whether an identifier of the user, (e.g., the phone number or email address) is found. If the user identifying information is found, the AP owner/operator user terminal proceeds to 324 to determine whether to automatically send the access information, at 328 or query the AP owner/operator to obtain confirmation that the access information can be sent to the wireless user terminal at 326.

At 314, if the user, if the AP owner/operator's contact information is not found in the contact list, call history, SMS history or any other communication history or log in the wireless user device the process clears the working information and returns to 302 where a new AP is selected.

At 322, if the user identifying information is not found, the AP owner/operator user terminal proceeds to clear the working information and returns to 302 where a new AP is selected.

Figure 4:
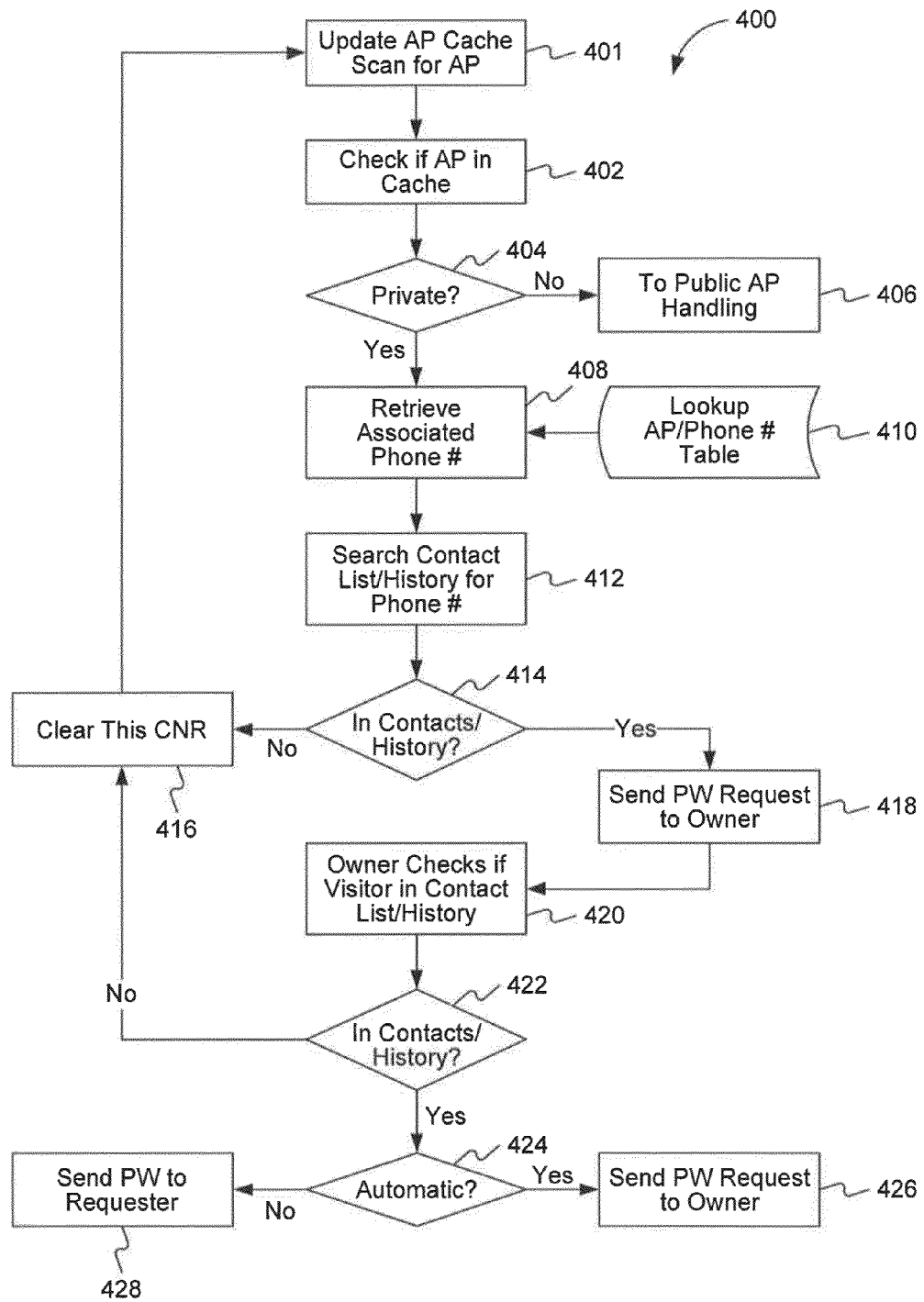
FIG. 4 is a flowchart of an alternate method for requesting access information according to an embodiment of the invention.

FIG. 4 shows a flow chart of a method 400 for real time pairing and sharing of network access information for private access points according to some embodiments of the invention. At 401, the wireless user terminal updates its AP cache (information about APs within reach) and scans for APs within reach. At 402, the wireless user terminal selects an AP and checks its AP cache to determine if information about the selected AP is found in the AP cache, for example using software executed thereon, and at 404 determines whether the AP is a public or private type of AP. A public AP is an AP that is probably open to the public and does not require a key, password or credentials to gain access. A private AP is an AP that is not open to the public and likely will require a key, password or credentials to gain access. The wireless user terminal can check information stored in memory regarding the AP to determine whether a key, password or credentials were needed to access the network through the AP. Where the AP is a public AP, the process branches to separate process for handling public APs. Where the AP is a private AP, the process continues at 408 where AP owner/operator identifying information is obtained by looking up the AP owner/operator identifying information in either a local table in the wireless user terminal or looking up the AP owner/operator identifying information in information stored on a central server, such as central server 120. The wireless user terminal can send the SSID and MAC address of the AP to the central server and the central server can search its files or a database to determine if the AP owner/operator identifying information is found in the database. If the SSID and MAC address are found by the central server, the AP owner/operator identifying information (e.g., a telephone number or an email address0 associated with the AP can be returned to the wireless user terminal. At 412, the wireless user terminal can search information stored on the wireless user terminal that indicates whether the user of the wireless user terminal has communicated with the AP owner/operator. For example, the telephone contact list can be searched to determine whether the AP owner/operator is in the user's contact list. Alternatively, the call history, the SMS message inbox/history and the email history can be searched. At 414, if the AP owner/operator's contact information is found in the contact list, call history, SMS history or any other communication history or log in the wireless user device, there is a likelihood that the user and the AP owner/operator have a relationship that can trigger, at 418, the transmission of a request, either to the user terminal of the AP owner/operator or to the central server requesting access information for the AP.

At 420, the user terminal of the AP owner/operator can receive the request and confirm that the requestor and the owner/operator already have relationship. At 422, the AP owner/operator user terminal can search its contacts, call history, SMS history and email to determine whether an identifier of the user, (e.g., the phone number or email address) is found. If the user identifying information is found, the AP owner/operator user terminal proceeds to 424 to determine whether to automatically send the access information, at 428 or query the AP owner/operator to obtain confirmation that the access information can be sent to the wireless user terminal at 426.

At 414, if the user, if the AP owner/operator's contact information is not found in the contact list, call history, SMS history or any other communication history or log in the wireless user device the process clears the working information and returns to 302 where a new AP is selected.

At 422, if the user identifying information is not found, the AP owner/operator user terminal proceeds to clear the working information and returns to 302 where a new AP is selected.

Figure 5:
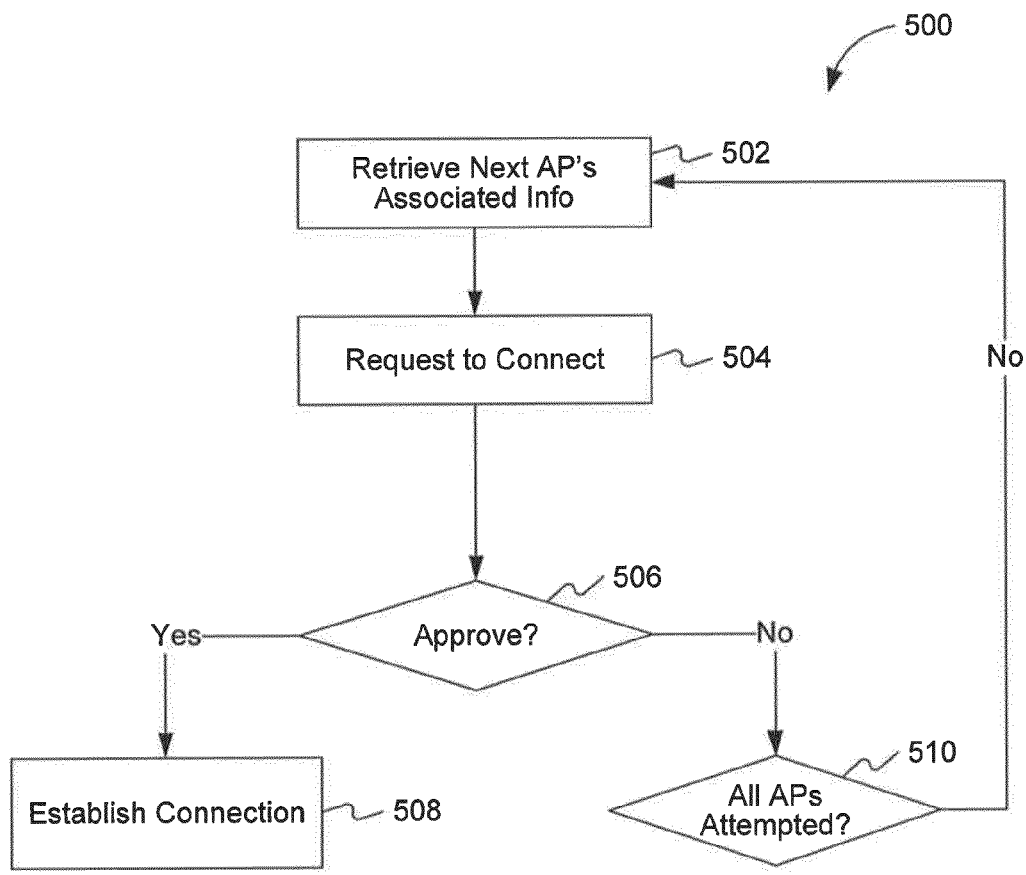
FIG. 5 is a flowchart of a method for selecting an access point to request access information for according to an embodiment of the invention.

FIG. 5 shows a method for handling public AP 500 according to some embodiments of the invention. At 502, the wireless user terminal, for example using software, selects an AP and retrieves information stored in memory about the AP. At 504, a request is presented on the display of the wireless user terminal to the user requesting the user to approve the selected AP. At 506, if the selection is approved, the process proceeds to 508 and the wireless user terminal attempts to connect to the selected AP. At 506, if the selection is not approved, the process proceeds to 510 which tests whether all APs in range have been presented to the user. At 510, if any APs in range remain to be presented, the process returns to 502 and a new AP is selected. At 510, if all the APs in range have been presented then the procedure stops.

Figure 6:
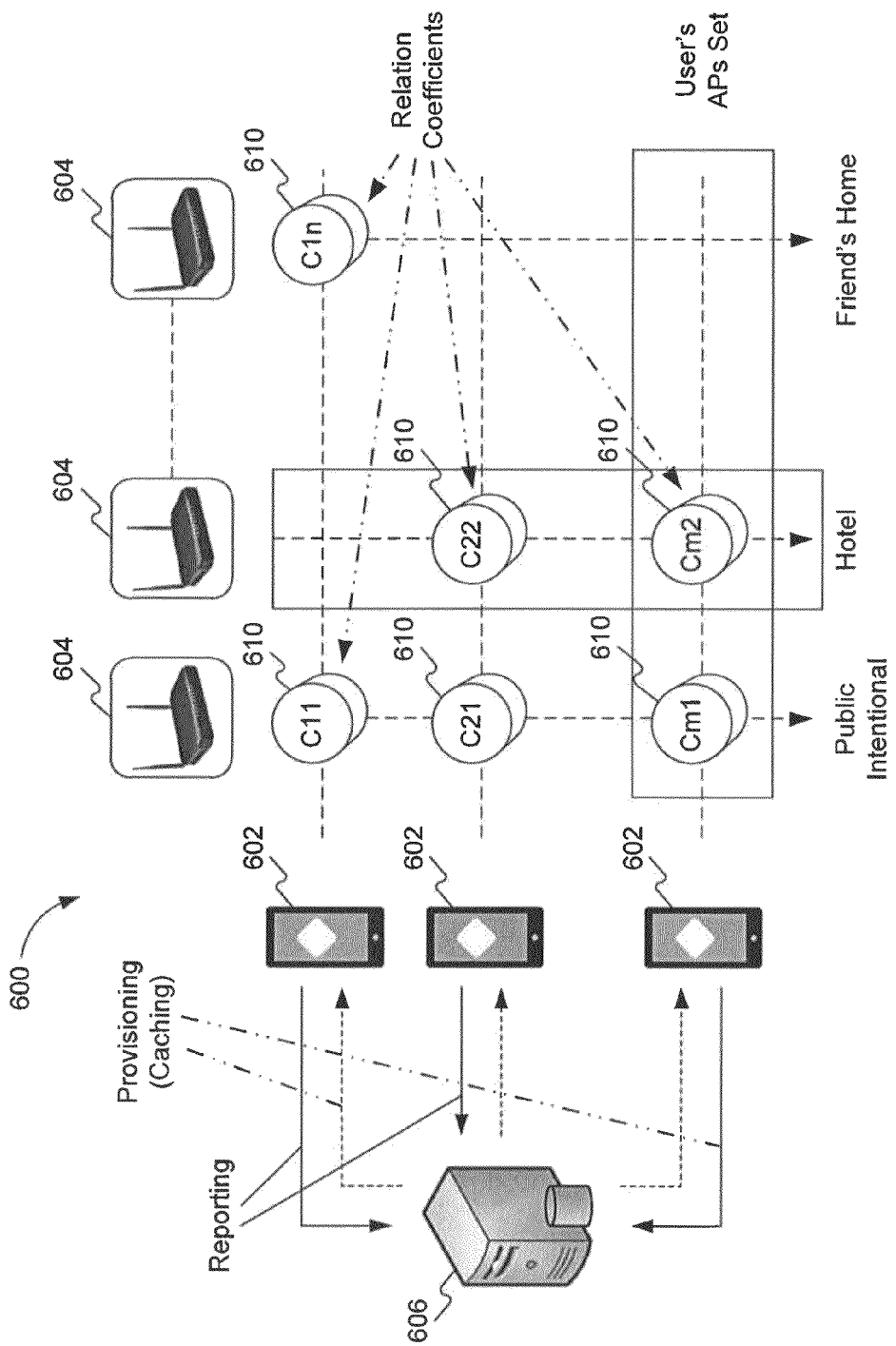
FIG. 6 is a diagrammatic showing the relationship between relationship coefficients, access points and wireless user terminals.

FIG. 6 shows a diagram depicting the relationships between various elements of the present invention. In accordance with some embodiments of the invention, the devices include wireless user terminals 602, wireless network access points 604, one or more servers 606, and the relation coefficients 610 which indicate a likelihood that the owner/operator of a wireless of a wireless AP will provide access information to the user. In addition, the wireless use terminals 602 can be programmed and configured to communicate with and transmit AP reports to one or more of the servers 606. The reports can include some or all of the information determined by the wireless user terminal 602 for each access point 604 that comes into range. In addition, one or more of the servers 606 can provide provisioning to the wireless user terminals 602 to enable the wireless user terminals to information about access points 604 in cache, for example, for use in offline mode.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A method in a wireless user terminal for selecting a network access point for offloading network traffic from a first network to a second network, wherein network access information is needed to connect to the second network through the network access point, the method comprising:
determining a measure of frequency representing a number of times the wireless user terminal discovers that the network access point is within range during one or more periods of time;
comparing the measure of frequency to a predefined threshold;
if the measure of frequency exceeds the predefined threshold, obtaining at least one piece of information identifying an owner of the network access point;
searching a contacts list in the wireless user terminal for the at least one piece of information identifying an owner of the network access point; and
if the at least one piece of information identifying an owner of the network access point is found in the contacts list, sending a request for network access information to an owner of the network access point.

2. The method according to claim 1 wherein the owner of the network access point is associated with an operator terminal, the method further comprising:
determining whether the wireless user terminal has communicated with the operator terminal.

3. The method according to claim 2 where determining whether the wireless user terminal has communicated with the operator terminal includes searching a call history log in the wireless user terminal for an identifier associated with the network access point owner.

4. The method according to claim 2 where determining whether the wireless user terminal has communicated with the operator terminal includes searching an SMS history log in the wireless user terminal for an identifier associated with the network access point owner.

5. The method according to claim 2 where determining whether the wireless user terminal has communicated with the operator terminal includes searching an email log in the wireless user terminal for an identifier associated with the network access point owner.

6. The method according to claim 2 wherein, if it is determined that the wireless user terminal has communicated with the operator terminal, sending a request for network access information to an owner of the network access point.

7. The method according to claim 1 further comprising:
computing a first relationship coefficient as a function of the measure of frequency, wherein the first relationship coefficient represents a likelihood of success of receiving access to the network access point;
comparing the first relationship coefficient to a predefined threshold; and
sending a request for network access information to an owner of the network access point if the first relationship coefficient is equal to, or greater than, the predefined threshold.

8. The method according to claim 7 further comprising:
determining a second relationship coefficient as a function of whether the at least one piece of information identifying an owner of the network access point is found in the contacts list; and
sending a request for network access information to an owner of the network access point if the second relationship coefficient is equal to, or greater than, the predefined threshold.

9. The method according to claim 8 further comprising:
determining a third relationship coefficient as a function of whether the at least one piece of information identifying an owner of the network access point is found in the call history; and
sending a request for network access information to an owner of the network access point if the third relationship coefficient is equal to, or greater than, the predefined threshold.

10. The method according to claim 9 further comprising:
determining a fourth relationship coefficient as a function of whether the at least one piece of information identifying an owner of the network access point is found in the SMS log; and
sending a request for network access information to an owner of the network access point if the fourth relationship coefficient is equal to, or greater than, the predefined threshold.

11. The method according to claim 1 wherein the one or more periods of time includes at least one of: morning, noon, afternoon, and evening.

12. The method according to claim 7 wherein the first relationship coefficient has a value falling in the range between 0 and 1, inclusive, wherein a value of 0 represents no likelihood of success of receiving access to the network access point and a value of 1 represents guaranteed access to the network access point.

13. The method according to claim 10 further comprising:
determining a fifth relationship coefficient as a weighted average of at least two of the first, second, third, and fourth relationship coefficients; and
sending a request for network access information to an owner of the network access point if the fifth relationship coefficient is equal to, or greater than, the predefined threshold.

* * * * *